United States Patent [15] 3,650,723
Wiley [45] Mar. 21, 1972

[54] GLASS GOB DELIVERY
[72] Inventor: Robert F. Wiley, Corning, N.Y.
[73] Assignee: Corning Glass Works, Corning, N.Y.
[22] Filed: Mar. 12, 1969
[21] Appl. No.: 806,605

[52] U.S. Cl. .................................65/169, 65/24, 65/225
[51] Int. Cl. .........................................C03b 39/00
[58] Field of Search.................65/25, 24, 26, 122, 165, 225, 65/169

[56] References Cited

UNITED STATES PATENTS 1,199,108  9/1916  Peiler.......................................65/25
1,638,593  9/1927  Mulholland..............................65/25

Primary Examiner—Frank W. Miga
Assistant Examiner—Saul R. Friedman
Attorney—Clarence R. Patty, Jr. and Charles W. Gregg

[57] ABSTRACT

Method of and apparatus for delivering gobs of molten glass to glass forming apparatus at substantially identical rates of speed, such apparatus and method comprising a sloping trough having a gob contacting surface arranged to be cooled below freezing temperature of water, and supplying a coolant or cooling medium to said trough to form frost on said surface.

1 Claims, 3 Drawing Figures

Patented March 21, 1972 3,650,722

INVENTOR.
Robert F. Wiley
BY Charles W. Gregg
AGENT 3,650,723

GLASS GOB DELIVERY

BACKGROUND OF THE INVENTION

In conveying or delivering gobs of molten glass to glass forming apparatus such as, for example, glass forming molds or the like, a sloping or inclined chute or trough is often used. Such chute or trough is arranged so that the outlet orifice of the forehearth from which said gobs are issued is disposed above the trough adjacent the upper end thereof and the gobs are thereby dropped or are otherwise issued into said trough to contact the inner surface of the bottom wall thereof and slide downwardly along such surface to the lower end of the trough and thence to the respective glass forming equipment being employed. So-called deflectors may or may not be used in conjunction with said chute or trough to deliver or convey the gobs to the glass forming apparatus employed.

It has long been known that gobs of molten glass delivered or conveyed as discussed above do not all travel or slide down the gob contacting surface of the chute or trough at the same velocity or rate of speed, that is, from gob to gob the velocities or rates of speed of travel may vary substantially. If, therefore, a succession of molds are successively positioned below the lower end of the trough for receipt of each successive glass gob issued to such trough adjacent the upper end thereof, the rate of speed of so positioning each successive mold will, of necessity, need to be regulated in accordance with the rate of speed of travel of gobs which move the slowest down the chute or trough. That is to say, the dwell period of each mold below the gob delivery end of the chute or trough must be selected in accordance with the velocity at which the slowest gob of a succession thereof travels down the chute or trough. Therefore, for the purpose of operating glass forming apparatus at the highest rate of speed possible, it is desirable to cause conveyance or delivery of a succession of said gobs at the same rate of speed, such rate of speed preferably being that of fastest moving gobs of a succession thereof. This will reduce the dwell period for each said mold at the gob delivery position, as will be readily apparent to those skilled in the art.

It is further desired to point out that, when each of a succession of gobs such as discussed above are being delivered or conveyed, in the manner also discussed above, to each of a succession of generally flat molds including forming cavities having bottom surfaces of a relatively large areal expanse, it is desirable and oftentimes necessary, to supply or deliver such gobs to said cavities in substantially identical positions, that is, so that each succeeding gob of a succession thereof contacts and rests on the bottom surface of the forming cavity of each succeeding mold in substantially the same area of such surface as the area in which each preceding gob contacted and rested on the bottom surface of the forming cavity of each preceding mold. Such positioning of said gobs is usually or oftentimes necessary in order to assure that each article formed in said succession of molds is, to the extent possible, substantially identical to each of the other articles formed in such succession of molds.

It has long been known that the temperature of a glass gob delivery or conveying chute or trough affects the rate of speed of movement or travel of gobs downwardly along the length of such chute or trough. It has also long been known that other conditions of a speculative or relatively unknown nature also affect such velocity or rate of speed. Means for overcoming said conditions or for providing solutions to the above-discussed problems have, therefore, long been sought. Among such means or solutions have been, for example, the supplying of lubricants such as mixtures of soap and water to the gob contacting and conveying surfaces of the delivery chutes or troughs, the fabrication of such chutes or troughs out of materials such as porous nickel, or the provision of a film of air or other gas on said surfaces of the chutes or troughs. U.S. Pat. No. 1,638,593, issued Aug. 9, 1927, to Vergil Mulholland, covers, for example, several previously tried solutions for the above-mentioned problems. While each of the above-mentioned solutions, including those disclosed in the Mulholland patent, provide for a somewhat improved delivery or conveyance of glass gobs by a delivery chute or trough, such solutions have been found not to be entirely satisfactory for one reason or another and, therefore, have not met with general acceptance and/or approval. Accordingly, attempts to find a substantially optimum solution to said problems have continuously been made, and the method and apparatus of the present invention was finally developed.

SUMMARY OF THE INVENTION

In the present invention there is provided a glass gob delivery or conveying chute or trough having provisions for supplying a coolant or cooling medium thereto for the purpose of cooling the gob contacting surface of the chute or trough to a temperature below the freezing temperature of water to form frost on said surface. Such frost is formed from condensed water vapor from the air of the surroundings of the chute or trough and, if the humidity of such air is not sufficiently high, humidifier apparatus may be employed to increase such humidity. So-called deflectors may be employed in conjunction with the chute or trough in some gob delivery or conveying systems.

BRIEF DESCRIPTION OF THE DRAWINGS

In the drawings.

Similar reference characters refer to similar parts in each of the figures of the drawings.

PREFERRED EMBODIMENTS OF THE INVENTION

Figures 1, 2, 3:
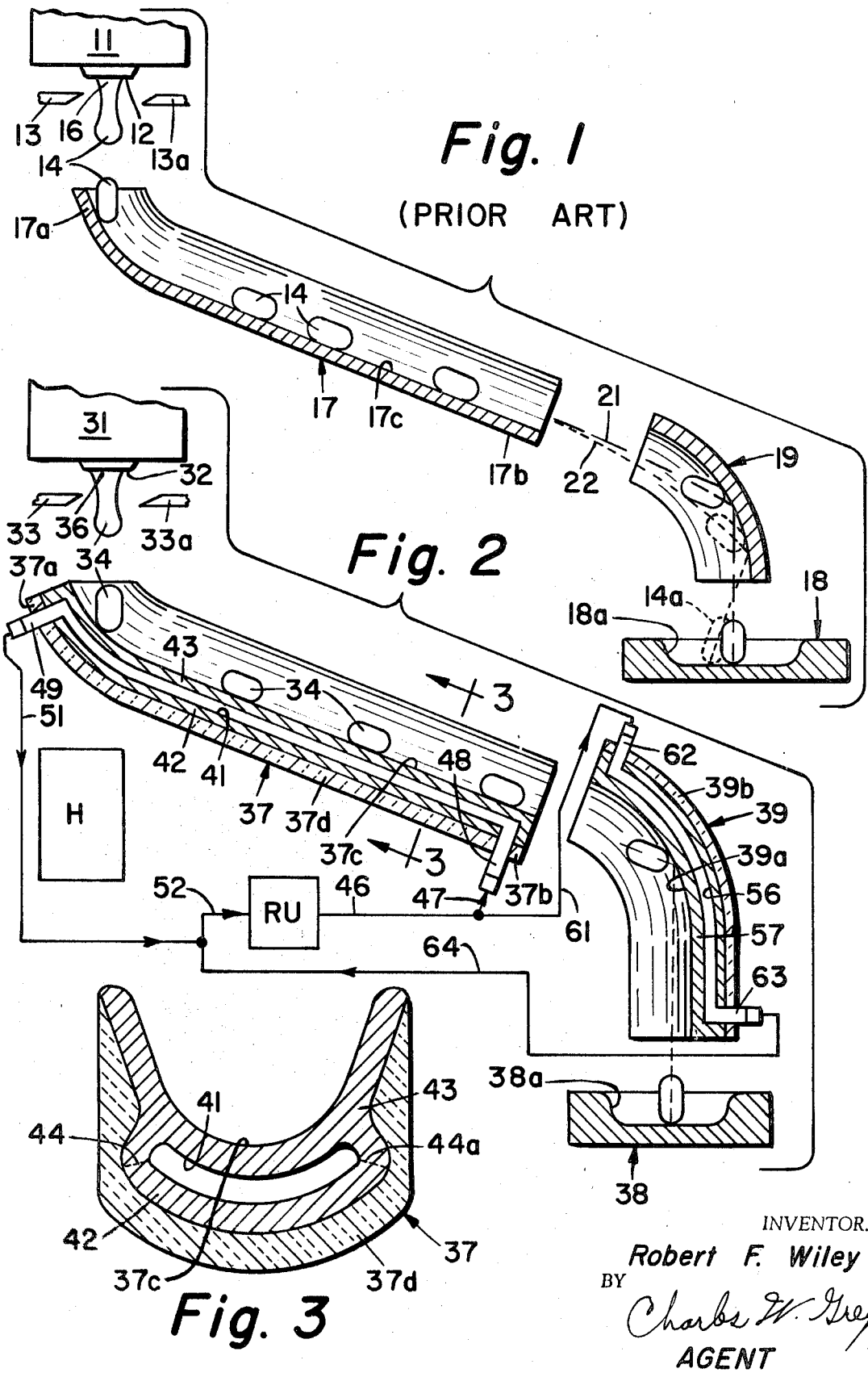
FIG. 1 comprises a cross-sectional elevational view of an apparatus of the prior art and illustrating a problem encountered during the use of such apparatus.
FIG. 2 is a view similar to FIG. 1 and illustrating one form of apparatus embodying the present invention.
FIG. 3 is a detailed view of part of the apparatus of FIG. 2, such view being taken generally along line 3—3 of FIG. 2.

Referring to the drawings in detail, there is shown in FIG. 1 a conventional apparatus including a forehearth 11, an outlet or glass issuing orifice 12 in the bottom wall of the forehearth, and a glass shearing device or shears comprising blades 13 and 13a which separate molten glass gobs such as 14 from a parent body of molten glass 16 issuing from orifice 12.

Orifice 12 of forehearth 11 is positioned adjacent the upper end 17a of a sloping or inclined gob conveying or gob delivery chute or trough 17, and the lower end 17b of such chute or trough is illustrated as positioned near a glass forming mold 18 for delivery of the gobs such as 14 to the glass forming cavity 18a of such mold. A deflector 19 is shown as positioned between the lower end 17b of chute or trough 17 for deflection of the gobs such as 14 into mold cavity 18a of mold 18. In practice, a deflector such as 19 may or may not be employed in conjunction with a gob delivery or conveying chute or trough such as 17, but such deflector is shown in the drawings for purposes of illustration of one of the previously mentioned problems encountered in employing a conventional gob delivery trough such as that illustrated.

As will be readily apparent to those skilled in the art and as mentioned above, the apparatus arrangement shown in FIG. 1 is a conventional form of glass gob delivery or conveying apparatus.

Referring further to FIG. 1, it will be noted that the gobs such as 14 of molten glass are illustrated as being spaced at different distances from preceding and succeeding gobs as such gobs slide or are conveyed down the gob contacting surface 17c of the bottom of chute or trough 17. While the gobs such as 14 are of uniform size and are issued from orifice 12 of forehearth 11 at regular intervals, that is, while the periods of time between the issuance of each preceding gob and the issuance of each next succeeding gob are equal, the gobs, as illustrated in FIG. 1, become unevenly spaced during their journey down trough or chute 17. This is, as previously discussed, due to different velocities or rates of speed of the gobs, such as 14, during said journey.

As illustrated in FIG. 1, it will be assumed that a so-called high-speed gob issues from the lower end 17b of chute 17 and follows the path of travel illustrated by the dashed line 21 shown in said drawing figure and, therefore, strikes the curve of the inside surface of deflector 19 so as to be deposited on the bottom surface of cavity 18a in mold 18 in an area at substantially the center of such surface. Under such conditions, a so-called slow-speed gob sliding down trough or chute 17 will issue from the lower end 17b of such chute and will follow a path of travel illustrated by the dotted line 22 in FIG. 1. Such gob will, therefore, contact or strike the curve of the inside surface of deflector 19 so as to be deposited on the bottom surface of cavity 18a in mold 18 in an off-center area illustrated by gob 14a shown by dotted lines. By such illustration and description, it will be readily apparent that gobs sliding down chute 17 at different velocities will be delivered to mold cavity 18a of mold 18 at different locations therein.

Referring now to FIGS. 2 and 3 of the drawings, the apparatus of the present invention will be described.

There is shown in FIG. 2 a forehearth 31 including a glass issuing orifice or outlet 32, and a glass shearing device or shears comprising blades 33 and 33a which separate glass gobs such as 34 from a parent body of molten glass 36 issuing from orifice 12. As is readily apparent such apparatus is similar to that shown in FIG. 1 and references 31, 32, 33, 33a, 34 and 36 correspond respectively to references 11, 12, 13, 13a, 14 and 16 of FIG. 1 of the drawings.

A gob delivery or conveying chute 37 having an upper end 37a positioned below outlet orifice 32 of forehearth 31, a lower gob issuing end 17b, and a gob contacting and conveying surface 37c is also illustrated in FIG. 2. Chute 37 is provided with an hermetic chamber such as 41 (FIGS. 2 and 3) which is positioned below the wall of chute 37 whose upper surface 37c is the gob contacting and conveying surface of chute 37. A chute such as 37 may, for example, be provided with a chamber such as 41 by attaching a lower member such as 42 to an upper member such as 43 along lines indicated by the dotted lines 44 and 44a in FIG. 3. The attachment of the members such as 42 and 43 to each other may be performed, for example, by the welding of said members to each other along said lines 44 and 44a.

Surface 37c of trough or chute 37 may be cooled to below the freezing temperature of water by maintaining a supply of a cooling medium, such as solidified carbon dioxide for example, within chamber 41 of chute 37. However, 37c may be cooled to the desired temperature by supplying a compressed coolant to chamber 41 from either a replaceable tank of such a coolant or from a refrigeration unit to which the coolant is returned for reuse. The use of a refrigeration unit is preferred and, therefore, there is shown schematically in FIG. 2, a refrigeration unit RU from which a suitable coolant is supplied over pipes or conduits 46 and 47 to a combined coolant inlet conduit and expansion valve 48 adjacent the lower end 37b of trough or chute 37 and hermetically connected with chamber 41 in such chute or trough. A coolant outlet conduit 49 is hermetically connected with chamber 41 adjacent upper end 37a of chute or trough 37, and coolant return conduits 51 and 52 are connected between outlet conduit 49 and refrigeration unit RU. Such refrigeration systems are well known and no further details thereof are considered necessary.

Although not necessarily required, it is usually preferable to provide a deflector for use in conjunction with a gob delivery chute or trough such as 37. For example, as previously discussed, a deflector 19 is illustrated in FIG. 1 as being employed with chute or trough 17. Similarly, therefore, a deflector 39 discussed below is illustrated in FIG. 2 as being employed with chute or trough 37.

Deflector 39 may be a deflector similar to deflector 19 shown in FIG. 1 but, to assure optimum delivery of the glass gobs such as 34 (FIG. 2) to the mold cavity 38a in a mold 38, deflector 39 is preferably provided with an hermetic cavity 56 adjacent wall 57 of the deflector against whose surface 39a the gobs such as 34 strike to be deflected into cavity 38a in mold 38. As will be obvious to those skilled in the art, cavity 56 may be provided in deflector 39 in a manner similar to that in which cavity 41 is provided in chute or trough 37. Surface 39a of deflector 39 may be cooled to a desired temperature in any of the manners previously discussed for the cooling of surface 37c in chute or trough 37. However, it is expedient to cool said surface 39a by the use of the coolant from refrigeration unit RU and, therefore, a conduit or pipe 61 connects the previously mentioned conduit 46 from unit RU to a combined coolant inlet conduit and expansion valve 62 which is hermetically connected to chamber 56 in deflector 39 near the upper end of such deflector. A coolant return conduit 64 is connected between the previously mentioned conduit 51 leading to unit RU and a coolant outlet conduit 63 which is hermetically connected with chamber 56 adjacent the lower end of deflector 39.

It is pointed out that chute or trough 37 is preferably provided with a thermally insulating jacket 37d (FIGS. 2 and 3) while deflector 39, when provided with a cooling chamber such as 56, is also preferably provided with a thermally insulating jacket 39b (FIG. 2). Such jackets are, of course, preferably provided for the purpose of preventing, to the extent possible, heat from sources other than said gobs 34 from reaching chute or trough 37 and deflector 39.

In employing the apparatus shown in FIG. 2, surface 37c of chute or trough 37 and, when a deflector such as 39 is used, surface 39a of such deflector, are first cooled substantially below the freezing temperature of water. Such temperature may, for example, be a temperature on the order of 15° F. By such cooling of said surfaces, frost forms thereon from the water vapor in the air of the surroundings or environs of chute or trough 37 and deflector 39, such frost being formed by said water vapor condensing on said surfaces and then becoming frozen due to the low temperature of such surfaces. While, in most glass making plants, water is employed in sufficient quantities that the air in such plants has a relatively high humidity, that is, contains a relatively high percentage of water vapor, if conditions are found where sufficient water vapor is not present in the air for the formation of said frost, a humidifier such as H may be provided for the purpose of increasing the water vapor in said air to or above the point at which said frost is satisfactorily formed. Alternatively, mists or fine sprays of water may be directed toward surfaces 37c and 39a to aid in said frost formation.

Following a sufficient frost formation on surfaces 37c and 39a of chute and deflector 37 and 39, respectively, glass from the parent body 36 of molten glass is issued from outlet orifice 32 of forehearth 31 and shear blades 33 and 33a are actuated to provide, at regularly timed intervals, gobs, such as 34, of molten glass. Such gobs drop into the upper end of chute or trough 37 and slide down the frost or coating of frost formed on surface 37c of chute or trough 37.

As illustrated in FIG. 2, the gobs such as 34 slide or travel down chute or trough 37 with optimumly equal spacing between the gobs, thereby, indicating that the gobs are moving down said chute at equal velocities or rates of speed. Such equal rates of speed assure that each gob such as 34 issues from the lower exit end 37b of trough or chute 37 with the same momentum as each of the other gobs and, therefore, that each such gob strikes the curve of surface 39a of deflector 39 at the same point as each of the other gobs. Each of the gobs are thus deflected downwardly into the cavity 38a of an associated mold such as 38 to contact substantially the same area of the bottom of the cavity 38a of the respectively associated mold into which the respective gob is deflected.

The frost formed on surface 37c of chute or trough 37 provides for the formation of a film or layer of steam or vapor beneath each gob supplied to said chute or trough and sliding downwardly along surface 37c of such chute or trough. Such films or layers of steam or vapor optimumly assure substantially equal velocities or rates of speed of movement of the gobs sliding down the delivery trough or chute.

Since different compositions of glasses are worked at different temperatures, gobs from different batches of molten glass may be at different temperatures when supplied to a chute or trough such as 37. Therefore, the temperature to which surface 37c of chute or trough 37 must be cooled in order that a coating of frost will be maintained or provided on said surface for each succeeding gob of a succession of gobs supplied thereto, may depend somewhat on the composition of the glass batch from which such succession of gobs are formed. That is to say, since the temperatures at which glasses of different compositions are worked are often different, the temperature to which surface 37c of chute or trough 37 must be cooled to form and maintain said frost often depends on the composition of the molten glass from which a succession of gobs are formed. Furthermore, the rate of speed at which successive gobs can be formed usually varies with glass composition and temperature and, therefore, the temperature to which said surface 37c must be cooled is also somewhat dependent on the rate of speed of gob formation and the rate of speed at which such formed gobs are supplied to chute or trough 37. However, the temperatures to or below which surface 37c of chute or trough 37 must be lowered can readily be determined by a very minimum amount of experimentation. In any event, a relatively low temperature can initially be employed, for said surface 37c and such temperature then adjusted upwardly, if desired, to determine the temperature at which the frost on said surface is no longer suitably formed or adequately maintained. The temperature of surface 37c is then cooled and maintained below such temperature. It is well to point out that the temperature at which it is considered that said coating of frost is adequately maintained is a temperature sufficiently low that a virgin coating of frost is formed on surface 37c between each successive glass gob supplied to trough or chute 37. This assures that the coefficient of sliding friction between surface 37c and each said gob is substantially identical for each such gob.

I claim:

1. The improvement in a sloping chute or trough used for conveying gobs of molten glass towards forming apparatus, such improvement comprising,
   A. a cooling chamber on said trough for cooling the gob conveying surface thereof,
   B. means for supplying a coolant to said chamber, and
   C. means for maintaining said coolant at a temperature sufficient to cool said gob conveying surface to frost forming temperature.

* * * * *